United States Patent
Han et al.

(10) Patent No.: US 10,387,739 B2
(45) Date of Patent: Aug. 20, 2019

(54) METHOD AND DEVICE FOR COMPLEX AUTHENTICATION

(71) Applicant: Samsung Electronics Co., Ltd., Suwon-si, Gyeonggi-do (KR)

(72) Inventors: Seungju Han, Seoul (KR); Byungin Yoo, Seoul (KR); Jaejoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 41 days.

(21) Appl. No.: 15/175,315

(22) Filed: Jun. 7, 2016

(65) Prior Publication Data
US 2017/0116490 A1    Apr. 27, 2017

(30) Foreign Application Priority Data
Oct. 21, 2015    (KR) ........................ 10-2015-0146816

(51) Int. Cl.
| | | |
|---|---|---|
| *G06K 9/00* | (2006.01) | |
| *G06F 21/32* | (2013.01) | |
| *H04L 29/06* | (2006.01) | |
| *H04M 1/673* | (2006.01) | |

(52) U.S. Cl.
CPC ......... *G06K 9/00892* (2013.01); *G06F 21/32* (2013.01); *G06K 9/00087* (2013.01); *G06K 9/00288* (2013.01); *G06K 9/00315* (2013.01); *H04L 63/0861* (2013.01); *H04M 1/673* (2013.01); *H04M 2250/22* (2013.01)

(58) Field of Classification Search
CPC ................ G06F 21/32; G06K 9/00892; G06K 9/00315; G06K 9/00087; G06K 9/00288; H04L 63/0861; H04M 2250/22; H04M 1/673
See application file for complete search history.

(56) References Cited

U.S. PATENT DOCUMENTS

| | | | |
|---|---|---|---|
| 8,457,367 B1 | 6/2013 | Sipe et al. | |
| 9,684,779 B2 * | 6/2017 | Bao | ......................... G06F 21/32 |
| 9,953,183 B2 * | 4/2018 | Peterson | ................. G06F 21/32 |
| 10,075,618 B2 * | 9/2018 | Erdler | .................... H04N 1/444 |
| 2002/0184538 A1 * | 12/2002 | Sugimura | ............... G06F 21/10 |
| | | | 726/6 |
| 2006/0050933 A1 | 3/2006 | Adam et al. | |
| 2009/0116703 A1 * | 5/2009 | Schultz | ................... G06F 21/32 |
| | | | 382/118 |
| 2009/0309702 A1 * | 12/2009 | Hirai | ...................... G06F 21/32 |
| | | | 340/5.83 |

(Continued)

FOREIGN PATENT DOCUMENTS

| | | |
|---|---|---|
| JP | 2013/190992 A | 9/2013 |
| JP | 2014/062984 A | 4/2014 |

(Continued)

*Primary Examiner* — Wesley J Tucker
(74) *Attorney, Agent, or Firm* — Harness, Dickey & Pierce, P.L.C.

(57) ABSTRACT

A complex authentication method includes identifying a user based on at least one image of a face image and a fingerprint image; identifying a first pattern associated with at least one of a feature point extracted from the face image and a first input to a display of an electronic device; and performing an operation assigned to the identified user and the identified first pattern.

16 Claims, 10 Drawing Sheets

(56) References Cited

U.S. PATENT DOCUMENTS

| | | | |
|---|---|---|---|
| 2014/0249819 A1 | 9/2014 | Jaramillo et al. | |
| 2016/0132670 A1* | 5/2016 | Salama | G06F 21/32 726/19 |
| 2017/0064062 A1* | 3/2017 | Lee | H04M 1/7253 |
| 2018/0121715 A1* | 5/2018 | Woo | G06F 3/048 |

FOREIGN PATENT DOCUMENTS

| | | |
|---|---|---|
| KR | 101464446 B1 | 11/2014 |
| KR | 2015/0034074 A | 4/2015 |
| KR | 2015/0047735 A | 5/2015 |

\* cited by examiner

METHOD AND DEVICE FOR COMPLEX AUTHENTICATION

CROSS-REFERENCE TO RELATED APPLICATION

This application claims priority under 35 U.S.C. § 119 to Korean Patent Application No. 10-2015-0146816, filed on. Oct. 21, 2015, in the Korean Intellectual Property Office, the entire contents of which are incorporated herein by reference in its entirety.

BACKGROUND

1. Field

At least one example embodiment relates to a complex authentication device and method.

2. Description of the Related Art

Biometric authentication technology may recognize various types of bioinformation, for example, a fingerprint, an iris, and a face, and recognize a user for which user authentication is to be performed. For example, bioinformation of a human body may be used to identify a user in an entrance control device, a smartphone, and the like. The bioinformation may include, for example, a fingerprint, a venous pattern, a face, and an iris, all of which may not be readily fabricated and forged.

A method of recognizing such bioinformation may broadly include a contact type method and a contactless type method. The contact type method may use, for example, a fingerprint and a venous pattern. The contactless type method may use, for example, a face and an iris.

However, using only one type of bioinformation to perform authentication, reliability of the authentication may decrease.

SUMMARY

At least one example embodiment relates to a complex authentication method.

According to at least one example embodiments, a complex authentication method includes identifying a user based on at least one image of a face image and a fingerprint image; identifying a first pattern associated with at least one of a feature point extracted from the face image and a first input to a display of an electronic device; and performing an operation assigned to the identified user and the identified first pattern.

The identifying of the first pattern may include defining a feature point group including a plurality of feature points based on the at least one feature point extracted from the face image; detecting a change in a form of the feature point group; and identifying, as the first pattern, a pattern associated with the feature point based on the detected change in a form.

The identifying of the first pattern may include receiving an input or an input sequence for a plurality of touch points assigned based on the at least one feature point extracted from the face image; and identifying, as the first pattern, a pattern associated with the feature point and the first input based on the received input or input sequence and the detected change in a form.

The identifying of the first pattern may include receiving an input corresponding to at least a portion of the face image; detecting a change in a location relationship among a plurality of feature points in the at least a portion in which the input corresponding to at least a portion of the face image is detected; and identifying the first pattern based on the change in a location relationship.

The identifying of the first pattern may include assigning a plurality of touch points on the display based on the feature point extracted from the face image; receiving an input or an input sequence corresponding to the touch points; and identifying a pattern associated with the first input to the display based on the received input or input sequence.

The performing of the operation may include executing an application of the electronic device, the application being assigned to the identified pattern in an account corresponding to the identified user.

The performing of the operation may include authenticating a registered user based on the identified user and the identified pattern; and changing a lock state of the electronic device to an unlock state in response to the authenticating indicating a successful authentication.

The identifying of the user may include identifying a registered user corresponding to the face image.

The identifying of the user may include obtaining the fingerprint image from the first input to the display; and identifying a registered user corresponding to the fingerprint image.

A non-transitory computer readable medium may store computer-executable instructions that, when executed by one or more processors, cause the one or more processors to perform the complex authentication method.

According to at least some example embodiments, an electronic device for complex authentication includes a display configured to receive a first input from a user; memory storing computer-executable instructions; and one or more processors configured to execute the instructions such that the one or more processors are configured to, identify the user based on at least one image of a face image and a fingerprint image, identify a pattern associated with at least one of a feature point extracted from the face image and the first input to the display, and perform an operation based on the identified user and the identified pattern.

The one or more processors may be configured to define a feature point group including a plurality of feature points based on the feature point extracted from the face image, detect a change in a form of the feature point group, and identify, as the first pattern, a pattern associated with the feature point based on the detected change in a form.

The one or more processors may be configured to receive an input or an input sequence corresponding to a plurality of touch points signed based on the feature point extracted from the face image, and identify, as the first pattern, a pattern associated with the feature point and the first input based on the received input or input sequence and based on the detected change in a form.

The one or more processors may be configured to receive an input corresponding to at least a portion of the face image, detect a change in a location relationship among a plurality of feature points in the at least a portion in which the input corresponding to at least a portion of the face image is detected, and identify the first pattern based on the change in a location relationship.

The one or more processors may be configured to assign a plurality of touch points on the display based on the feature point extracted from the face image, receive an input or an input sequence for the touch points, and identify, as the first pattern, a pattern associated with the first input to the display based on the received input or input sequence.

The one or more processors may be configured to execute an application of the electronic device, the application being assigned to the identified pattern in an account corresponding to the identified user.

The one or more processors may be configured to authenticate a registered user based on the identified user and the identified first pattern, and change a lock state of the electronic device to an unlock state in response to the authenticating indicating a successful authentication.

The one or more processors may be configured to identify a registered user corresponding to at least one of the face image and the fingerprint image obtained from the first input to the display.

According to at least some example embodiments of the inventive concepts, a complex authentication method includes receiving a face image; tracking a movement of at least one feature point extracted from the received face image; identifying an expressional change sequence based on the extracted feature point in response to the movement of the feature point; and performing an operation corresponding to the identified expressional change sequence.

The method may further include assigning a touch point on the face image based on the at least one feature point extracted from the face image; and identifying an input sequence for the touch point assigned on a display, and wherein the performing of the operation includes performing the operation based on the identified expressional change sequence and the identified input sequence.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
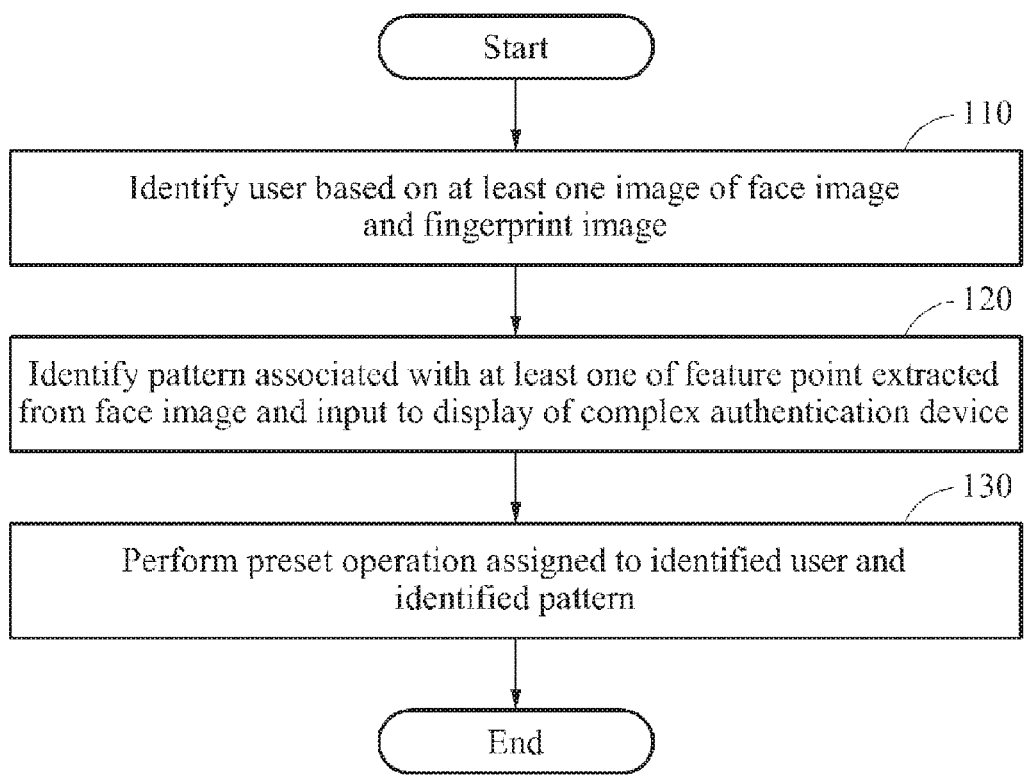
FIGS. 1 through 3 are flowcharts illustrating examples of a complex authentication method according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective of some cross-sectional views) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and in a two-dimensional pattern.

FIGS. 1-4 are described with reference to complex authentication device, examples of which include a complex authentication device 400 of FIGS. 5-8 and complex authentication device 900 of FIGS. 9 and 10, which will be discussed in greater detail below with reference to FIGS. 8-10.

Figure 2:
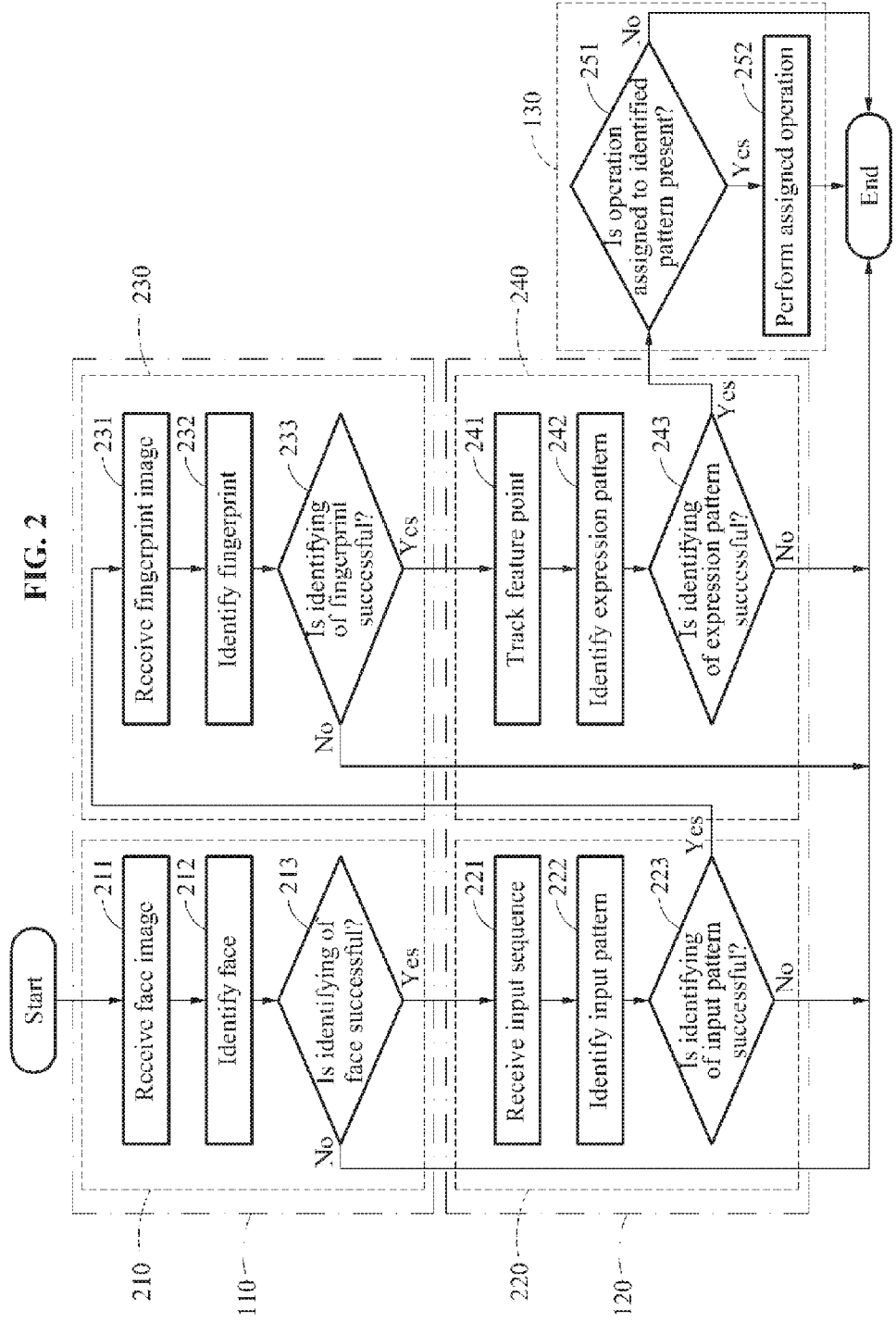
Figure 3:
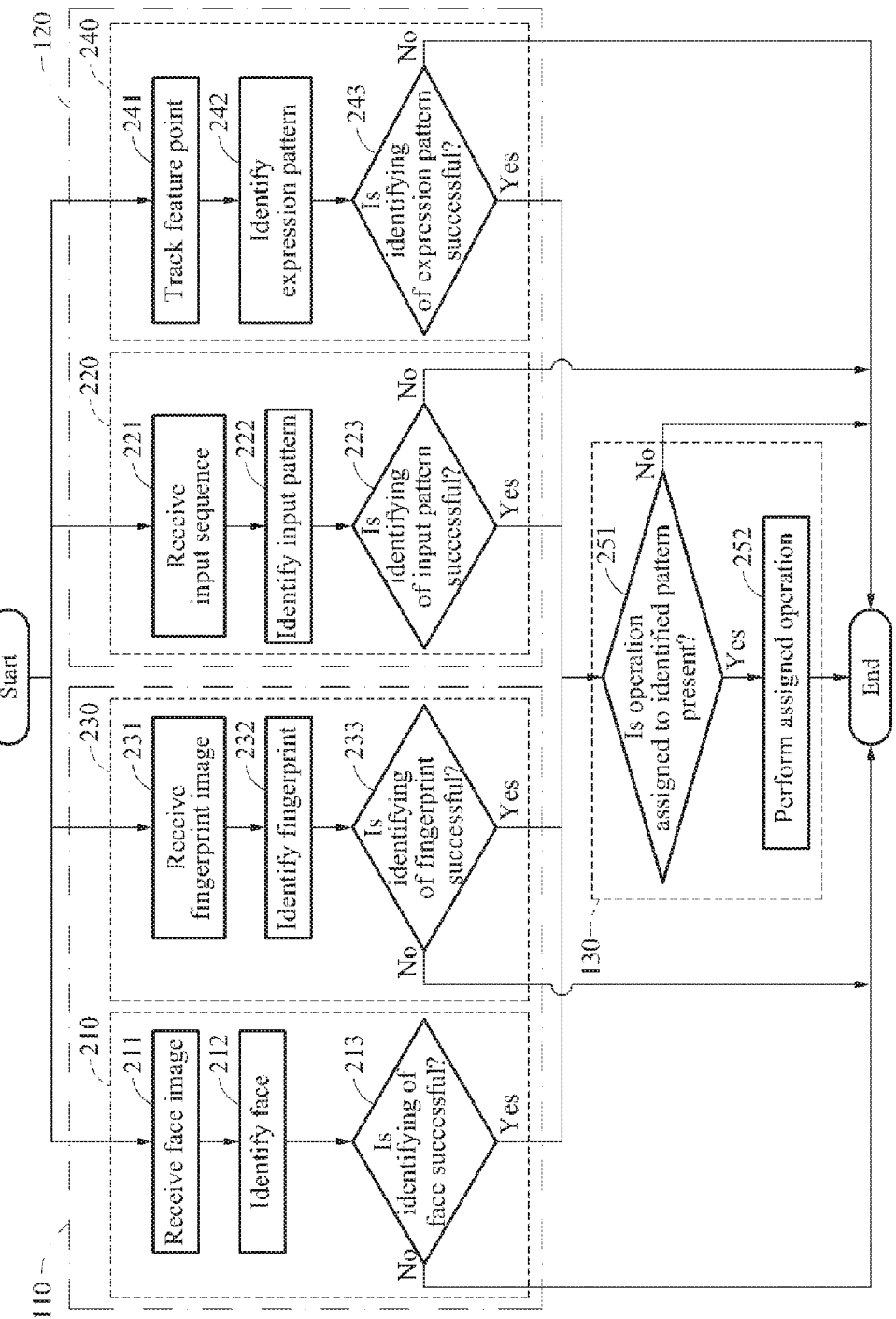

FIGS. 1 through 3 are flowcharts illustrating examples of a complex authentication method according to at least one example embodiment.

FIG. 1 is an overall flowchart of a complex authentication method according to at least one example embodiment.

Referring to FIG. 1, in operation 110, a processor of an electronic device for complex authentication, hereinafter simply referred to as a complex authentication device, identifies a user based on at least one image of a face image and a fingerprint image (i.e., based on information that includes at least one face image, information that includes at least one fingerprint image, or information that includes any combination of at least one face image and at least one fingerprint image).

The face image refers to an image including a human face. For example, the face image may be an image including at least a portion of a human face. The fingerprint image refers to an image including a human fingerprint. For example, the fingerprint image may be an image including at least a portion of a human fingerprint.

According to at least one example embodiment, the processor may identify the user from the face image and the fingerprint image through a model trained through a machine learning algorithm. For example, the processor may extract a feature from the face image and the fingerprint image, and identify the user corresponding to the extracted feature.

Here, machine learning and the machine learning algorithm refers to a process and operations of training a trainer or a learner to output an identifier (ID) of a registered user corresponding to a training image, for example, a training face image and a training fingerprint image. The trainer may include a machine learning structure, for example, a neural network, a hidden Markov model (HMM), a Bayesian network, a support vector machine (SVM), and a decision tree (DT). However, the identifying of the user is not limited to the details described in the foregoing, and thus various technologies for identifying a user from a face image, various technologies for identifying a user from a fingerprint image, and various technologies for identifying a user from both a face image and a fingerprint image may be used.

In operation 120, the processor identifies a pattern associated with at least one of a feature point extracted from the face image and an input to a display of the complex authentication device (i.e., a pattern associated with a feature point extracted from the face image, a pattern associated with an input to a display of the complex authentication device, or a pattern associated with any combination of a feature point extracted from the face image and a pattern associated with an input to a display of the complex authentication device). For example, the processor may identify a pre-registered (e.g., stored) pattern matching the pattern associated with at least one of the feature point and the input to the display. For example, the processor may identify a pattern matching the pattern associated with at least one of the feature point and the input to the display. For another example, the processor may identify a pattern having a highest similarity to the pattern associated with at least one of the feature point and the input.

The feature point refers to a point indicating a feature representing a human face in the face image, for example, an eye, a nose, a lip, and an eyebrow. For example, the processor may extract the feature point using, for example, a principal component analysis (PCA) and a linear discriminate analysis (LDA), as an algorithm for extracting a feature point of a human face. However, the algorithm for extracting a feature point is not limited to the aforementioned example, and the feature point limited to an eye, a nose, a lip, and an eyebrow is provided as a simple example.

The input to the display refers to an input applied onto the display. For example, the input to the display indicates a touch formed by a contact between the display and an object, a trace of a touch formed by an object and maintained until the touch is released, a gesture formed by a touch, an approach of an object towards the display by a distance less than a threshold distance, a pressure applied by a touch formed on the display, a magnitude of the pressure, and the like. However, the input to the display is not limited to the aforementioned examples.

The pattern associated with the feature point refers to a pattern associated with a disposition and a movement of the feature point in the face image, and may also be referred to as an expression pattern in a description to be provided later. For example, the pattern associated with the feature point may include a feature point disposition pattern corresponding to an expression, for example, a grimace and a smile, in the face image, a feature point disposition change pattern corresponding to an expressional change, for example, a wink, and a feature point disposition change sequence corresponding expressions changing in a predetermined order or, alternatively, a desired order, for example, a smile after a wink. The feature point disposition change sequence indicates sequential occurrence of changes in a disposition of feature points in a predetermined order or, alternatively, a desired order. The feature point disposition change sequence may include, for example, a sequence in which a feature point disposition changes to be a feature point disposition corresponding to a face with a right eye closed and then to a feature point disposition corresponding to a face with a left eye closed. Such a feature point disposition change sequence may also be referred to as an expressional change sequence.

The pattern associated with the input to the display indicates a pattern associated with, for example, a location of an input applied onto the display and a sequence of inputs or an input sequence, and may also be referred to as an input pattern in a description to be provided later. For example, the pattern associated with the input may include a pattern in which an input is applied to a location on the display, and an input sequence in which inputs are applied onto the display in a predetermined order or, alternatively, a desired order. For example, the input sequence indicates a sequence of inputs of a type, for example, a touch, a gesture, a pressure, and a pressure of a predetermined magnitude or, alternatively, a desired magnitude, applied to a location on the display in a predetermined order or, alternatively, a desired order.

The pattern associated with the feature point and the input to the display indicates a complex pattern associated with both the feature point and the input. For example, the pattern associated with the feature point and the input to the display may include a pattern in which a disposition of a feature point changes at a location at which a touch is input.

In operation 130, the processor performs a preset operation assigned to the identified user and the identified pattern. The preset operation refers to an operation assigned to a pattern and may include, for example, executing an application of the complex authentication device and cancelling a lock state of the complex authentication device.

For example, the processor may execute an application of the complex authentication device, which is assigned to the identified pattern, in an account corresponding to the identified user. The application of the complex authentication device refers to a program to be executed by the processor of the complex authentication device and may include, for example, a camera application, a message application, a mail application, a messenger application, and a call application. However, the application is not limited to the aforementioned examples, and thus the application may change based on a design.

For another example, the processor may authenticate a registered user based on the identified user and the identified pattern. The processor may determine whether a user trying to access the complex authentication device is a valid user by authenticating the identified pattern in a user account of the identified user. Here, in response to a successful authentication, the processor may change a lock state of the complex authentication device to an unlock state. The lock state refers to a state in which at least a portion of functions of the complex authentication device is restricted, and the unlock state refers to a state in which the at least a portion of functions restricted in the lock state is allowed to be used. For example, although access to all functions of the complex authentication device is allowable in the unlock state, access to a portion of the functions may be restricted and access to remaining functions may be allowable for a user account based on a design.

FIG. 2 is a detailed flowchart of an example of the complex authentication method described with reference to FIG. 1. FIG. 2 illustrates a method of sequentially performing process 210 of identifying a face, process 220 of identifying an input pattern, process 230 of identifying a fingerprint, process 240 of identifying an expression pattern, and process 130 of performing an assigned operation. However, the complex authentication method is not limited to the aforementioned example illustrated in FIG. 2, and the processes 210, 220, 230, 240, and 130 may be performed in parallel.

The process 210 of identifying a face may be performed as follows.

Referring to FIG. 2, in operation 211, a processor of a complex authentication device receives a face image. Here, a camera of the complex authentication device may capture the face image and transfer the captured face image to the processor.

In operation 212, the processor identifies a face from the face image. For example, the processor may identify a registered user corresponding to the face image. The processor may identify the registered user corresponding to the face image through a trainer trained through a machine learning algorithm, and determine a user account corresponding to the identified user.

In operation 213, the processor determines whether the identifying of the face is successful. When the identifying of the face is successful, the processor may perform a subsequent operation. Conversely, when the identifying of the face fails, the processor may terminate an operation. In FIG. 2, the processor may perform a subsequent operation only when the identifying of the face is successful. In FIG. 3, the processor may perform a remaining operation although the identifying of the face fails.

The process 220 of identifying an input pattern may be performed as follows.

In operation 221, the processor receives an input sequence. For example, the processor may assign a plurality of touch points on a display of the complex authentication device based on a feature point extracted from the face image. The processor may receive an input or the input sequence for the touch points. For example, the processor may receive an input for one of the touch points, or the input sequence in which touches are sequentially input for at least a portion of the touch points.

In operation 222, the processor identifies an input pattern. For example, the processor may identify a pattern associated with the input to the display based on the received input or the received input sequence. The processor may identify a pre-registered (e.g., stored) input pattern matching the received input or the received input sequence.

In operation 223, the processor determines whether the identifying of the input pattern is successful. When the identifying of the input pattern is successful, the processor may perform a subsequent operation. Conversely, when the identifying of the input pattern fails, the processor may terminate an operation. In FIG. 2, the processor may perform a subsequent operation when the identifying of the input pattern is successful. In FIG. 3, the processor may perform a remaining operation although the identifying of the input pattern fails.

The process 230 of identifying a fingerprint may be performed as follows.

In operation 231, the processor receives a fingerprint image. For example, the processor may obtain the fingerprint image from an input to the display.

In operation 232, the processor identifies a fingerprint from the fingerprint image. For example, the processor may identity a registered user corresponding to the fingerprint image. The processor may identify the registered user from the fingerprint image using a trainer trained through a machine learning algorithm.

In operation 233, the processor determines whether the identifying of the fingerprint is successful. When the identifying of the fingerprint is successful, the processor may perform a subsequent operation. Conversely, when the identifying of the fingerprint fails, the processor may terminate an operation. In FIG. 2, the processor may perform a subsequent operation when the identifying of the fingerprint is successful. In FIG. 3, the processor may perform a remaining operation although the identifying of the fingerprint fails.

The process 240 of identifying an expression pattern may be performed as follows.

In operation 241, the processor tracks a feature point. For example, the processor may define a feature point group including a plurality of feature points based on a feature point extracted from the face image. The feature point group refers to a group indicating a feature of a human face and may be, for example, a group of feature points indicating an eye, a group of feature points indicating a lip, a group of feature points indicating a nose, and a group of feature points indicating an eyebrow. The processor may detect a change in a form of the feature point group. When a facial expression changes, the form of the feature point group may change.

The form of the feature point group indicates a location relationship among the feature points included in the feature point group. Thus, the change in the form of the feature point group indicates a change in the location relationship among the feature points. For example, when a user assumes a facial expression of closing eyes after keeping open eyes, a location relationship among feature points indicating the eyes may change and a form of a feature point group including the feature points may change to a form corresponding to the facial expression of closing the eyes.

In operation 242, the processor identifies an expression pattern. The expression pattern refers to a pattern associated with the feature point. For example, the processor may identify a pre-registered expression pattern corresponding to a detected disposition and movement of the feature point based on the feature point tracked in operation 241. In addition, the processor may identify the pattern associated with the feature point based on the change in the form detected in operation 241.

In operation 243, the processor determines whether the identifying of the expression pattern is successful. When the identifying of the expression pattern is successful, the processor may perform a subsequent operation. Conversely, when the identifying of the expression pattern fails, the processor may terminate an operation. In FIG. 2, the processor may perform a subsequent operation when the identifying of the expression pattern is successful. In FIG. 3, the processor may perform a remaining operation although the identifying of the expression pattern fails.

The process 130 of performing a preset operation assigned to the identified user and the identified pattern for the complex authentication device may be performed as follows.

In operation 251, the processor determines whether an operation assigned to the identified pattern is present. For example, the processor may determine whether an operation assigned to the input pattern identified in operation 222 is present, whether an operation assigned to the expression pattern identified in operation 242 is present, or whether an operation assigned to a complex pattern in which the input pattern and the expression pattern are combined is present. Here, the processor may determine presence or absence of an operation assigned to a pattern in a user account corresponding to the user identified in operations 212 and 232. For example, different operations may be assigned to a same pattern for each user account. For example, the processor may determine whether user information of the user stored in the complex authentication device indicates that a particular operation has been assigned to the identified gesture (i.e., the operation assigned is present) or not (i.e., the operation assigned is not present).

In operation 252, the processor performs the assigned operation. For example, the processor may perform an operation assigned to the expression identified in operation 242. However, the performing of the assigned operation is not limited to the aforementioned example, and the processor may perform an operation assigned to the input pattern identified in operation 222. For another ex e, in FIG. 3, the processor may perform an operation assigned to an input pattern identified in operation 222 or an expression identified in operation 242, or may perform an operation assigned to a complex pattern associated with both the input pattern and the expression pattern identified in corresponding operations, for example, a pattern associated with an expressional change at a location in a face after the location is touched. However, examples are not limited thereto, and the processor may authenticate a user account based on at least one of the face identified in operation 212 and the fingerprint identified in operation 232 in FIGS. 2 and 3, and perform an operation corresponding to a pattern determined based on at least one of the input pattern and the expression pattern in the authenticated user account. According to at least one example embodiment, an order of the operations is not limited to the example illustrated in FIG. 2, and thus may change based on a design. For example, as illustrated in FIG. 3, the processor may perform, in parallel, the processes 210, 220, 230, and 240, and perform the process 130 based on at least one of the identified input pattern, the identified expression pattern, and the complex pattern in which the input pattern and the expression pattern are combined.

In addition, examples are not limited to performing all the operations illustrated in FIGS. 2 and 3, and the processor may perform at least one of the processes 210, 220, 230, and 240 in series or in parallel, which will be described with reference to FIGS. 4 through 8. For example, the processor may perform the process 240 of identifying an expression pattern and the process 130 of performing a preset operation assigned to an identified pattern, which will be described in detail with reference to FIG. 6.

FIGS. 4 through 8 illustrate examples to which complex authentication is applied according to at least one example embodiment.

Figure 4:
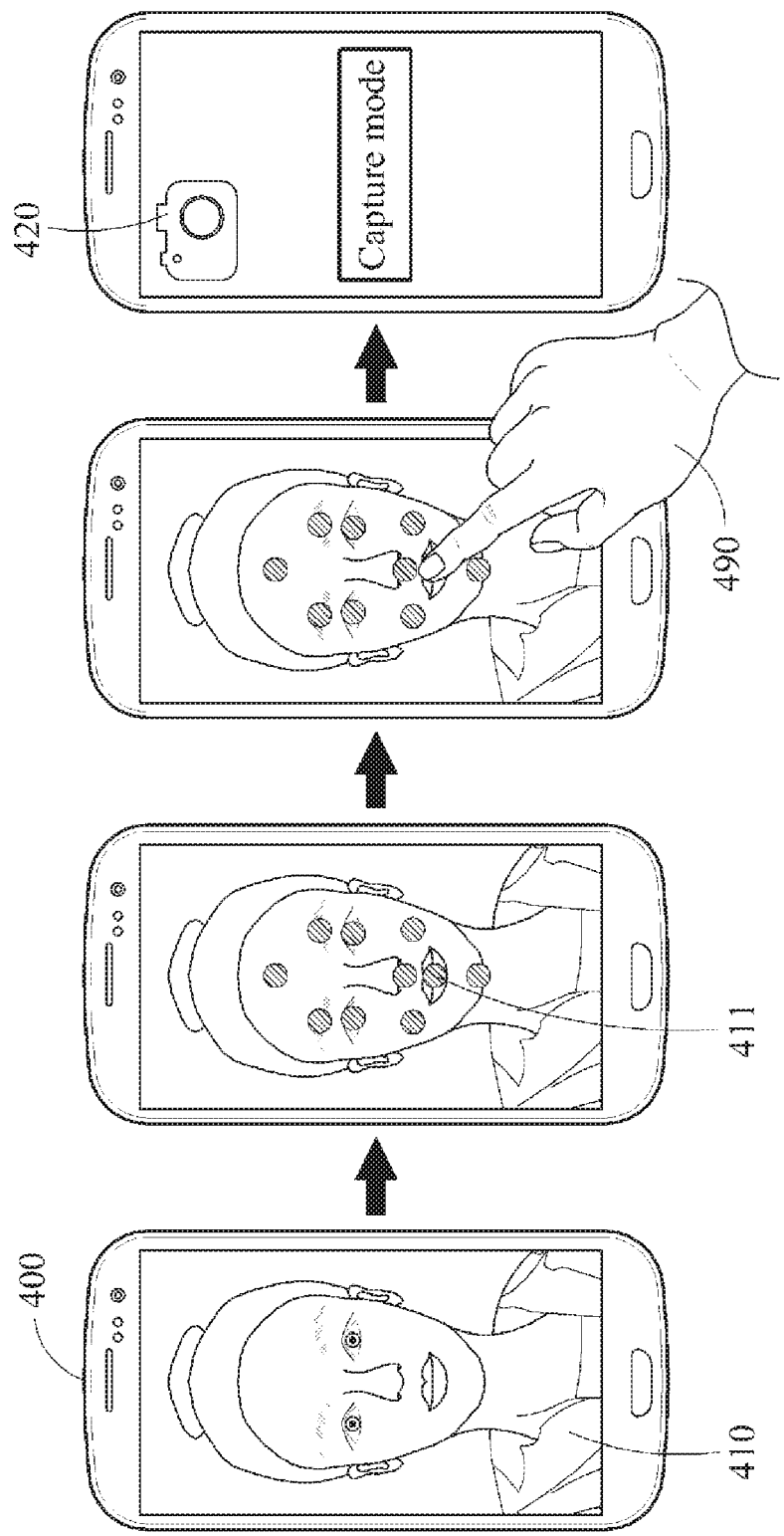
FIGS. 4 through 8 illustrate examples to which complex authentication is applied according to at least one example embodiment.

FIG. 4 illustrates an example of performing the process 210 of identifying a face, the process 220 of identifying an input pattern, and the process 130 of performing an assigned operation, which are described with reference to FIGS. 2 and 3. As illustrated in FIG. 4, a complex authentication device 400 may receive a face image 410. Here, the face image may be a color image, a black and white image, or a depth image, but may not be limited thereto. A processor of the complex authentication device 400 may control a display of the complex authentication device 400 to output the face image 410. Here, the complex authentication device 400 may identify the face image 410. Example structures of the authentication device 400 will be discussed in greater detail below with reference to the complex authentication device 900 of FIGS. 9 and 10.

Returning to FIG. 8, the processor may extract a feature point from the face image 410, and define a plurality of touch points based on the extracted feature point. For example, the processor may define a touch point corresponding to an eye, a touch point corresponding to a nose, and a touch point 411 corresponding to lips. Here, the processor may detect an input for each touch point. For example, a physical portion of a user, for example, a finger 490, may apply a touch input to the touch point 411 corresponding to the lips among the touch points.

The processor may detect the touch input in the touch point 411 corresponding to the lips, and perform an operation assigned to the touch input to the touch point 411. For example, as illustrated in FIG. 4, the processor may execute a camera application 420 in response to the touch input to the touch point 411 corresponding to the lips. However, the example illustrated in FIG. 4 is provided as a si PI example, and the assigned operation is not limited to executing the camera application 420. Thus, various applications may be executed or an operation of changing a lock state of the complex authentication device 400 to an unlock state may be performed. In addition, the touch input to the touch point 411 corresponding to the lips is provided as an example, and thus an input is not limited to the aforementioned example. Thus, the processor may receive a sliding input of sequentially touching touch points corresponding to a left eye and then a right eye, and execute a camera application corresponding to the sliding input.

Figure 5:
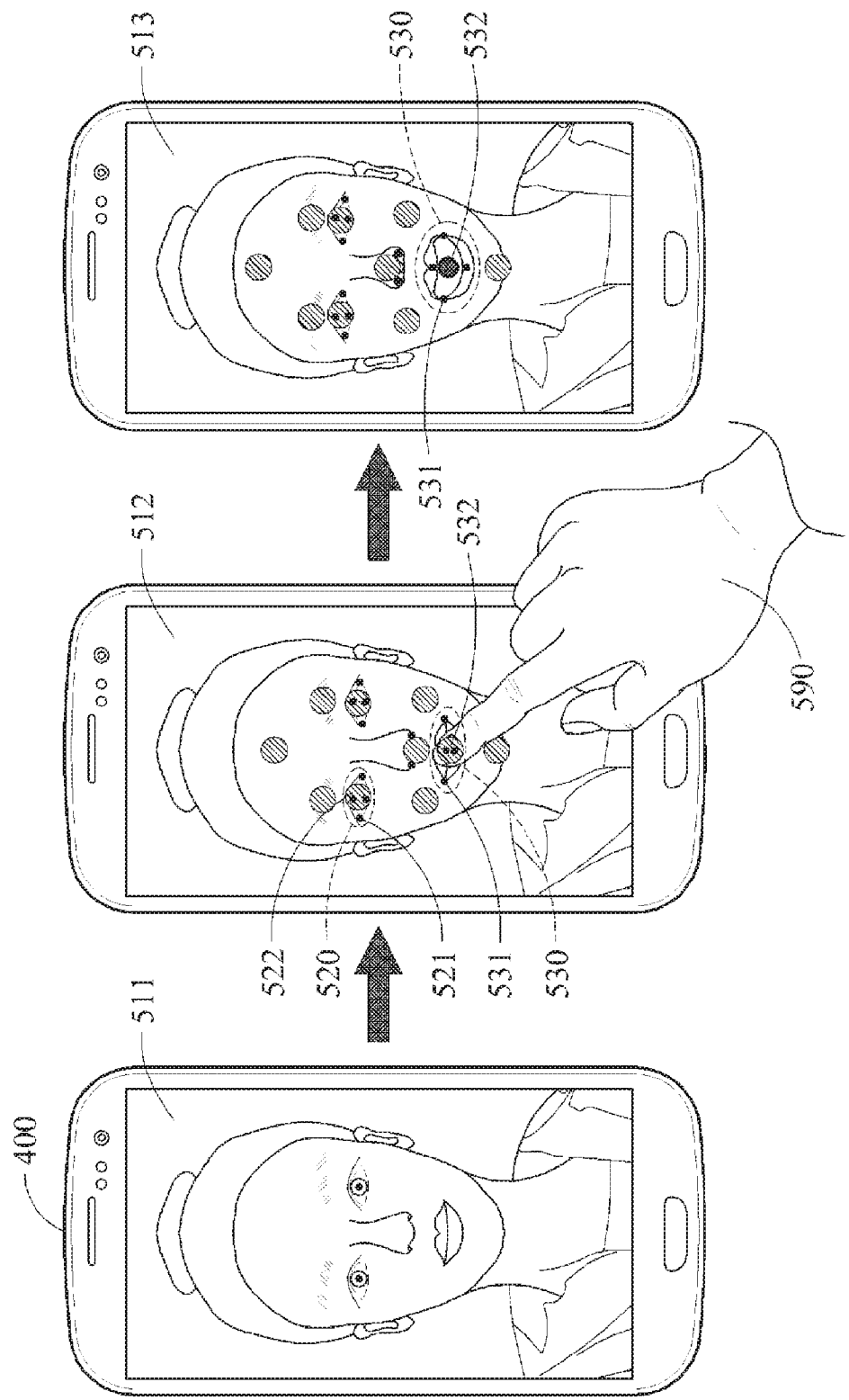

FIG. 5 illustrates an example of performing the process 210 of identifying a face, the process 240 of identifying an expression pattern, and the process 130 of performing an assigned operation, which are described with reference to FIGS. 2 and 3.

Referring to FIG. 5, a processor of a complex authentication device 400 may extract a feature point from a face image 511 and define a plurality of touch points, for example, a touch point 522 and a touch point 532. Here, the processor may detect an input for each of the touch points 522 and 532. For example, a physical portion of a user, for example, a finger 590, may apply a touch input to the touch point 532 corresponding to lips among the touch points 522 and 532.

The processor may define a feature point group including a plurality of feature points, for example, a feature point group 520 and a feature point group 530, based on a feature point extracted from a face image 512, for example, feature points 521 and feature points 531. The processor may detect a change in a form of the feature point groups 520 and 530. The processor may identify a pattern associated with a feature point based on the detected change in a form.

For example, the processor may receive an input for at least a portion of the face image 512, for example, the touch points 522 and 532. The processor may detect a change in a location relationship among the feature points 531 in the portion in which the input is detected. The processor may identify the pattern based on the change in a location relationship. In FIG. 5, the processor may detect the input at the touch point 532 corresponding to the lips and, in a subsequent face image 513, detect the change in a location relationship among the feature points 531 included in the feature point group 530 corresponding to the lips. Thus, the processor may identify a pattern associated with a feature point in parted lips from the face image 513.

In addition, the processor may receive an input sequence of sequential inputs for various points of the touch points 522 and 532. For example, the processor may receive an input or an input sequence for the touch points 522 and 532 assigned based on the feature points 521 and 531 extracted from the face image, for example, the face image 511, the face image 512, and the face image 513. The processor may identify the pattern associated with the feature point and the input based on the received input or the input sequence, and on the detected change in a form.

The processor may receive the face images 511, 512, and 513, and assign the touch points 522 and 532 onto the face image 512 based on the feature points 521 and 531 extracted from the face image 511. The processor may identify the input sequence for the touch points 522 and 532 assigned on a display of the complex authentication device 400, and perform a preset operation based on the identified expressional change sequence and the identified input sequence.

For example, although FIGS. 4 and 5 illustrates the examples of detecting a touch at a touch point corresponding to lips, examples are not limited thereto, and the processor may receive an input sequence of sequential touch inputs to a plurality of touch points, for example, a touch point corresponding to a left eye, a right eye, a nose, and lips. The processor may receive a gesture input indicating a trace sequentially formed based on a plurality of touch points, for example, a touch point corresponding to a left eye, a right eye, a nose, and lips. In addition, the processor may sequentially receive touch inputs to at least one touch point, and receive an input sequence of inputs to one touch point in order of, for example, a first magnitude pressure and a second magnitude pressure.

In response to an input or an input sequence for a touch point, the processor may detect a change in a form of a feature point group corresponding to the touch point at which the input or the input sequence occurs. The processor may identify an expression pattern based on the detected change in a form of a feature point group in response to the input or the input sequence.

The processor may detect a change in form of a feature point group in which an input or an input sequence occurs in response to the input or the input sequence for a touch point. The processor may identify an expression pattern based on the detected change in a form of the feature point group in response to the input or the input sequence.

Further, the input sequence may be pre-registered by a user or determined automatically and randomly by the processor.

For example, when a pattern is pre-registered by the user, the user may register, as an input pattern, a touch input to a touch point corresponding to lips to cancel a lock state of the complex authentication device 400.

For another example, when a pattern is automatically and randomly determined by the processor, the processor may determine, to be the pattern to cancel the lock state of the complex authentication device 400, a complex pattern in which a feature point and an input are combined, for example, a pattern associated with a touch input to a touch point corresponding to an eye and a change in a form of a feature point group corresponding to the eye, after a touch input to a touch point corresponding to lips and a change in a form of a feature point group corresponding to the lips. In such an example, when the user touches lips in a face image on the display, the lips may be opened. When the user touches an eye afterwards, the eye may be closed and the processor may cancel the lock state of the complex authentication device 400. However, the aforementioned examples are provided as an illustrative example only, and thus a pattern assigned to an operation based on a design may be pre-registered by a user or determined by the processor based on various inputs, input sequences, changes in a form, and form change sequences.

Figure 6:
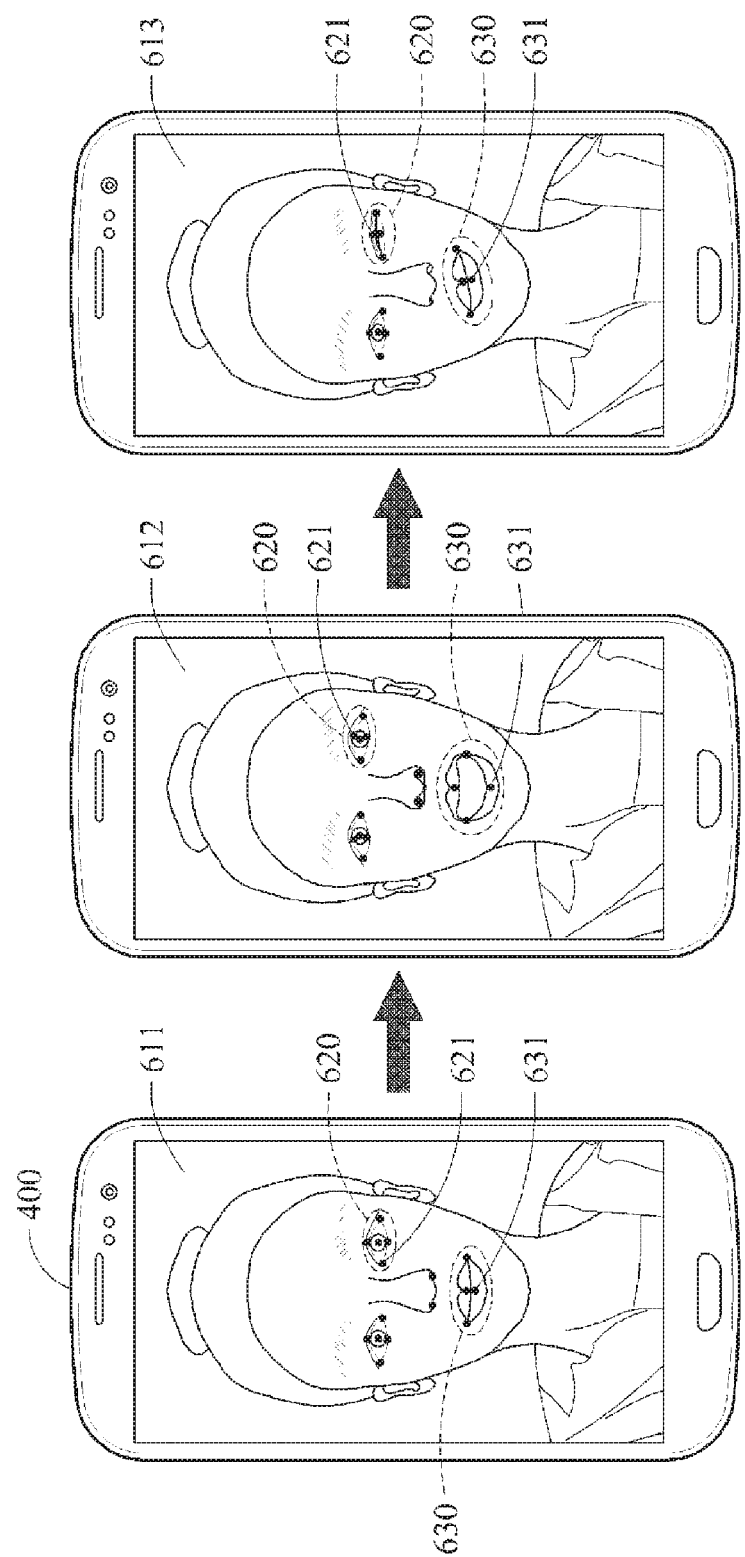

FIG. 6 illustrates an example of performing the process 240 of identifying an expression pattern.

Referring to FIG. 6, a processor of the complex authentication device 400 may receive a face image 611. Although the processor may identify a user corresponding to the face image 611, examples are not limited thereto and the processor may identify a facial expression change without identifying the user.

According to at least one example embodiment, the processor may track a movement of a feature point extracted from the received face image 611, for example, feature points 621 and feature points 631. For example, the processor may extract the feature points 621 and 631 from the face image 611, and track a movement of the feature points 621 and 631 in an image of a subsequent frame, for example, a face image 612 and a face image 613.

The processor may identify an expressional change sequence based on the extracted feature points 621 and 631 in response to the movement of the feature points 621 and 631. For example, the processor may detect a change in a location relationship among the feature points 631 in a feature point group 630 corresponding to lips in the successive face image 612. The processor may detect a change in a location relationship among the feature points 621 in a feature point group 620 corresponding to an eye in the successive face image 613. As illustrated in FIG. 6, the processor may identify an expressional change sequence in which lips are open and then an eye is closed. However, an expressional change sequence is not limited to the aforementioned example, and thus the expressional change sequence refers to a series of expressional changes to be identified by a movement of a location of a feature point. For example, the expressional change sequence may include various combinations of a series of expressional change, for example, an expression of opening lips and then closing the lips, an expression of closing both eyes and then opening the eyes, and an expression of closing a left eye and then opening lips.

The processor may perform a preset operation corresponding to the identified expressional change sequence. For example, the processor may execute an application pre-assigned to the identified expressional change sequence, or cancel a lock state of the complex authentication device 400 when the expressional change sequence corresponds to a pre-registered expression pattern.

Figure 7:
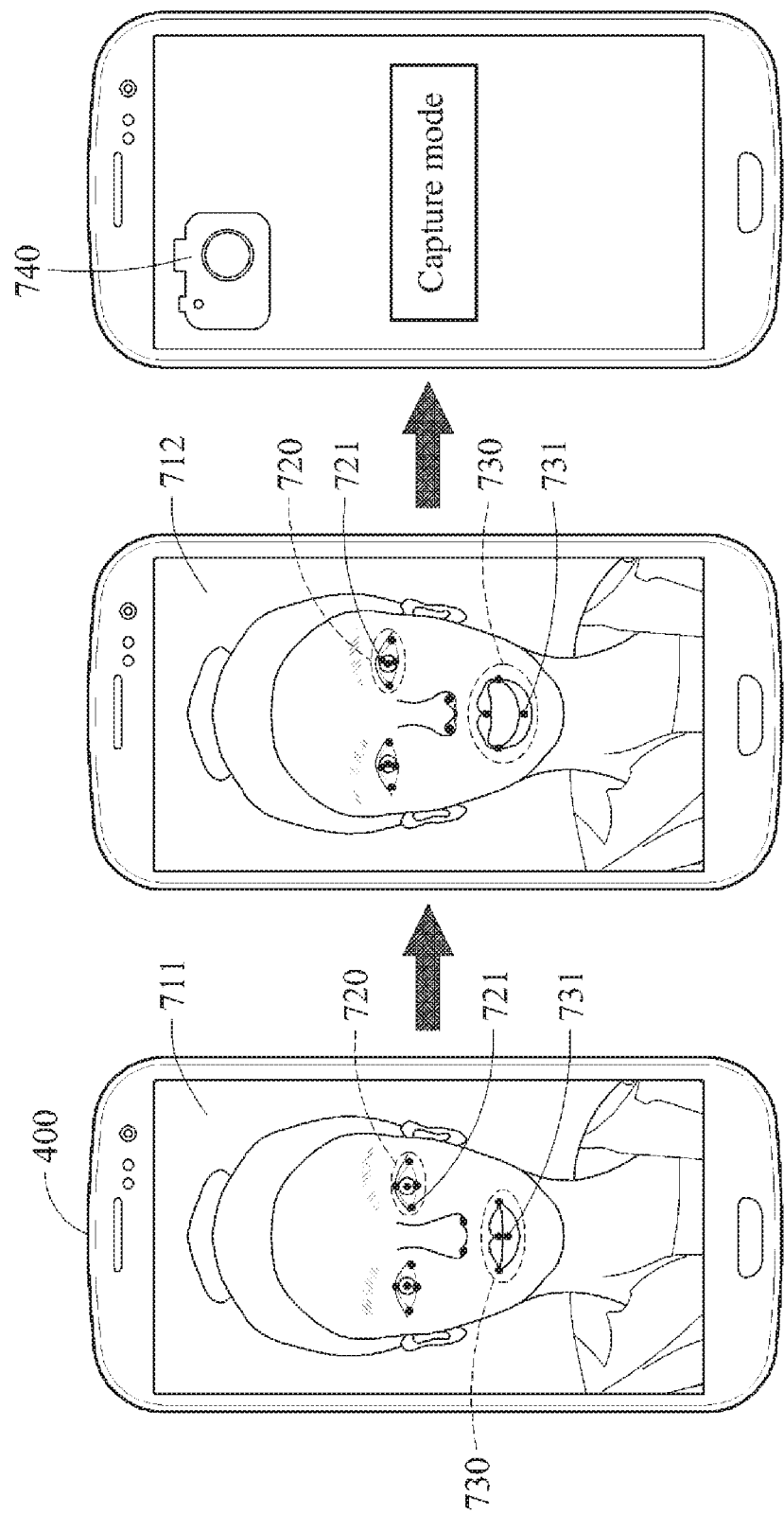

FIG. 7 illustrates an example of performing the process 210 of identifying a face, the process 240 of identifying an expression pattern, and the process 130 of performing an assigned operation.

Referring to FIG. 7, a processor of the complex authentication device 400 may authenticate a face image 711 by receiving the face image 711 and identifying a user. The processor may define a feature point group, for example, a feature point group 720 and a feature point group 730, by extracting feature points, for example, feature points 721 and feature points 731, from the face image 711. In addition, the processor may identify an expression pattern by tracking a movement of the extracted feature points 721 and 731 in a unit of a feature point group, for example, the feature point groups 720 and 730, in a successive face image 712. For example, the processor may identify an expression pattern in which a user opens lips based on a change in a location relationship among the feature points 731 in the feature point group 730, and execute a camera application 740 as an operation assigned to the identified expression pattern.

However, the expression pattern is not limited to the aforementioned example, and thus the expression pattern may include various expression patterns, for example, an expression pattern in which lips are opened and then closed, an expression pattern in which eyes are opened and then closed, an expression pattern of smiling, and an expression pattern of frowning. Also, the processor may differently set a type of an operation to be assigned to each expression pattern based on a design, for example, assigning an operation of executing a camera application for the expression pattern of smiling and assigning an operation of executing a game application for the expression pattern of frowning.

Figure 8:
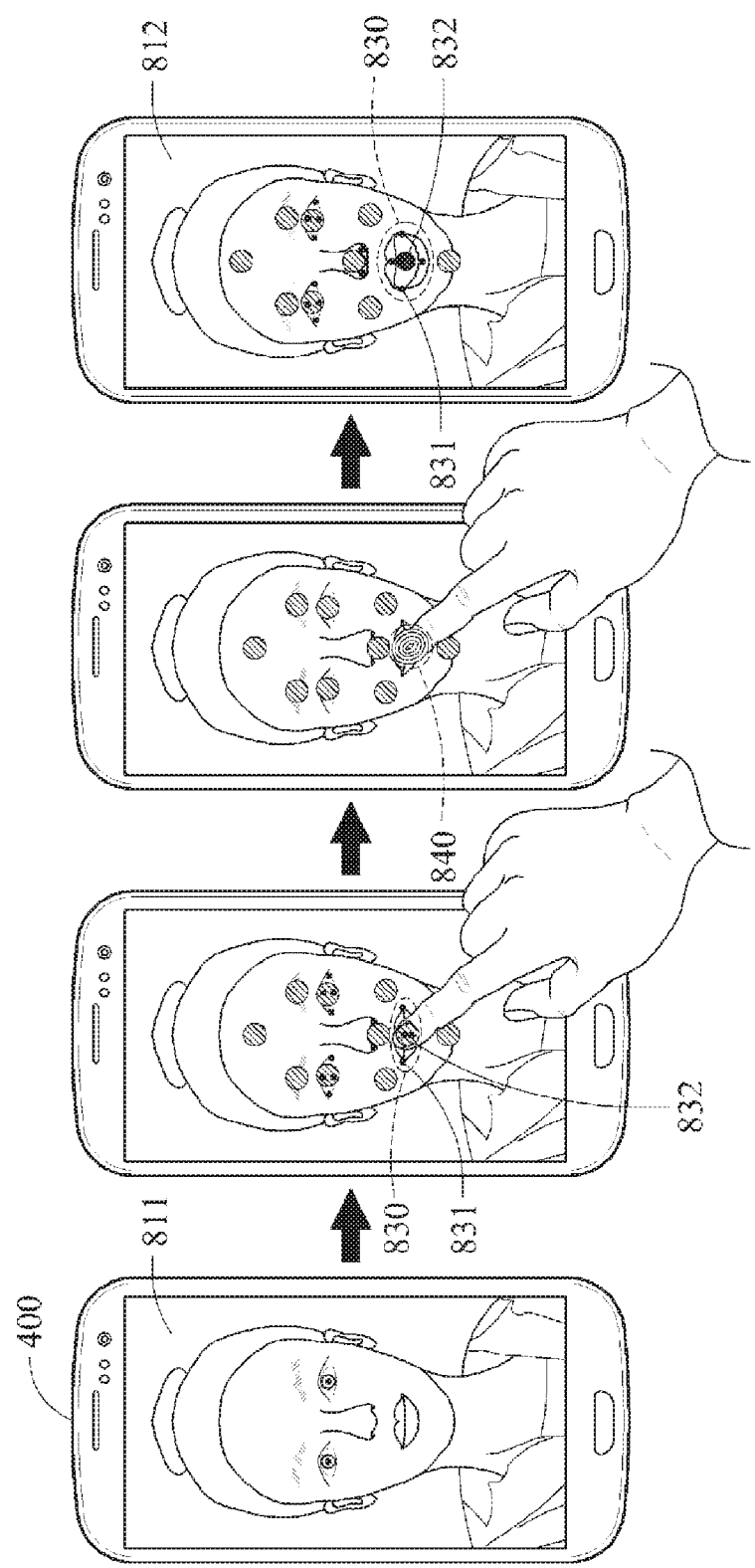

FIG. 8 illustrates an example of performing the process 210 of identifying a face, the process 220 of identifying an input pattern, the process 230 of identifying a fingerprint, and the process 240 of identifying an expression pattern.

Referring to FIG. 8, a processor of the complex authentication device 400 may extract a feature point from a face image 811 and define a plurality of touch points. Here, the processor may detect an input to each touch point, for example, a touch point 832. For example, a physical portion of a user, for example, a finger, may apply a touch input to the touch point 832 corresponding to lips among the touch points.

Here, when the touch input is received from the user, the processor may receive a fingerprint image 840 through a display of the complex authentication device 400. The processor may identify the user based on the received fingerprint image 840. For example, the processor may determine whether the received fingerprint image 840 corresponds to a registered user or an unregistered user.

In addition, the processor may define a feature point group 830 including a plurality of feature points based on a feature point 831 extracted from the face image 811. The processor may detect a change in a form of the feature point group 830 by tracking the feature point 831 in a successive face image 812. The processor may identify a pattern associated with the feature point 831 based on the detected change in a form.

Figure 9:
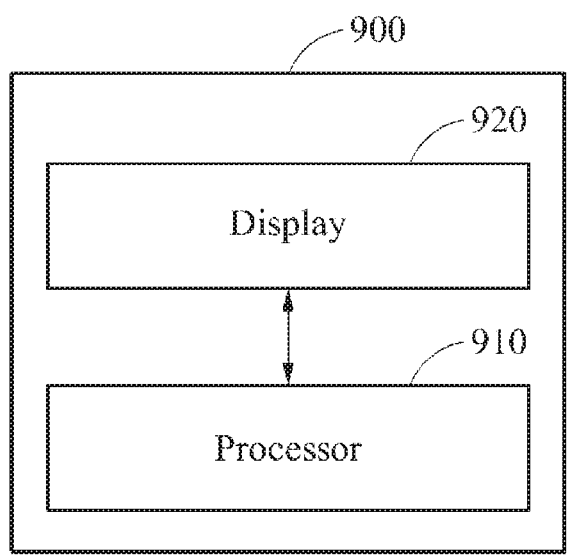
FIGS. 9 and 10 are diagrams illustrating examples of an electronic device for complex authentication according to at least one example embodiment.
Figure 10:
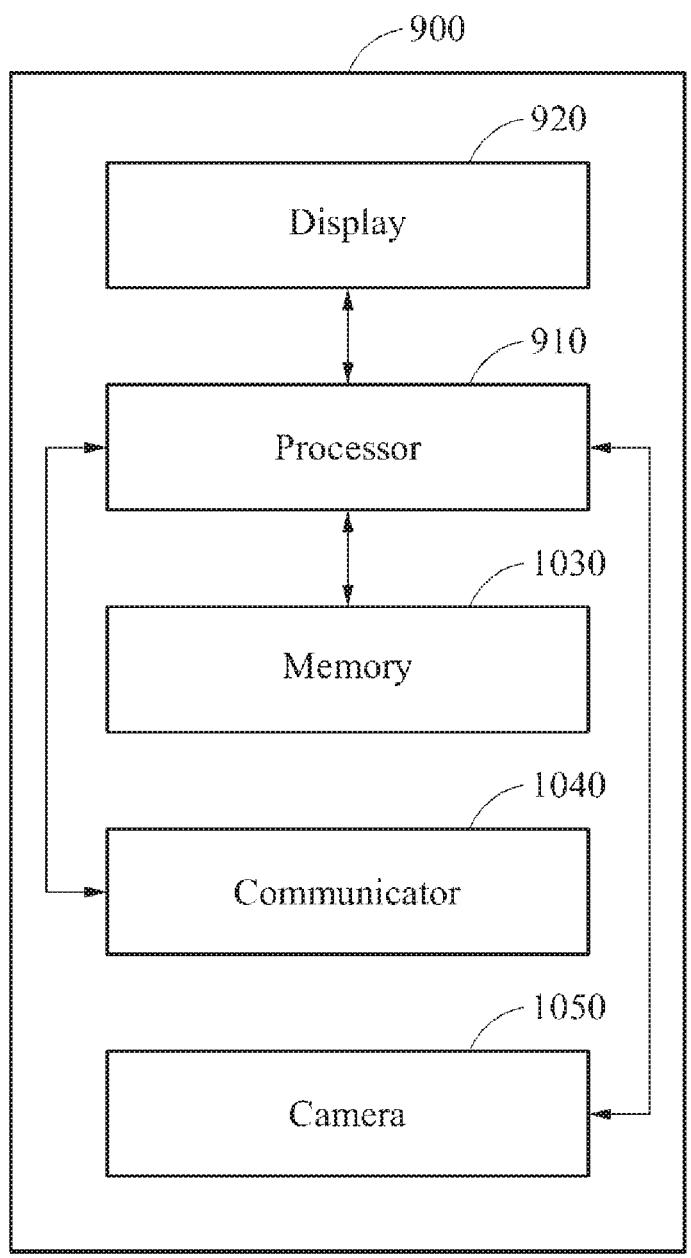

FIGS. 9 and 10 are diagrams illustrating examples of a complex authentication device 900 according to at least one example embodiment.

Referring to FIG. 9, the complex authentication device 900 includes a processor 910 and a display 920.

The processor 910 may identify a user based on at least one image of a face image and a fingerprint image, identify a pattern associated with at least one of a feature point extracted from the face image and an input to the display 920, and perform a preset operation based on the identified user and the identified pattern. The processor 910 may be configured to perform the methods described with reference to FIGS. 1 through 8. For example, the complex authentication device 900 may include memory storing computer-readable instructions corresponding to any or all operations described in the present disclosure as being performed by a complex authentication device (or an element thereof), and the processor 910 may be configured to execute the stored instructions. The processor 910 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The display 920 may receive the input from the user. The display 920 may output an image, and receive an input or an input sequence of sequential inputs from the user. For example, the display 920 may be, for example, a touchscreen display. In a case of the display 920 being a fingerprint recognition display, the display 920 may receive a fingerprint image. For example, the display 920 may radiate invisible light to an object in contact with the display 920, and receive a fingerprint image based on reflected light of the invisible light. However, a method of obtaining the fingerprint image by the display 920 is not limited to the aforementioned example.

Referring to FIG. 10, the complex authentication device 900 further includes a memory 1030, a communicator 1040, and a camera 1050.

The memory 1030 may store a program including a command to be executed by the processor 910. The memory 1030 may store data required for performing the methods described with reference to FIGS. 1 through 8. For example, the memory 1030 may store, temporarily or semi-permanently, a face image, a fingerprint image, an input pattern, an expression pattern, and information associated with a registered user, for example, a registered face image and face feature and a registered fingerprint image and fingerprint feature.

The communicator 1040 may transmit and receive data with an external device through a wire or wirelessly. For example, the communicator 1040 may transmit an authentication result to the external device or receive a face image or a fingerprint image from the external device. According to at least some example embodiments, the communicator may be embodied by a circuit or circuitry. According to at least some example embodiments, the communicator may be embodied by a processor e.g., processor 910) executing computer-readable instructions stored, for example in the complex authentication device 900.

The camera 1050 may capture an image. For example, the camera 1050 may capture a face image and transfer the captured face image to the processor 910.

According to at least one example embodiment, the complex authentication device 900 may strengthen a level of security in an authentication process through face identification, an input pattern for a touch point defined based on a feature point, an expression pattern identified by tracking a feature point, and fingerprint identification. For example, the complex authentication device 900 may identify a user through a face and a fingerprint, and verify whether the user is a valid user through an input pattern and an expression pattern. In addition, the complex authentication device 900 may detect a fakery or a fabrication of a face image through the expression pattern. Further, the complex authentication device 900 may provide user convenience by performing an operation assigned to a pattern associated with at least one of the input and the feature point in a user account identified through the face and the fingerprint.

The units and/or modules described herein may be implemented using hardware components and software components. For example, the hardware components may include microphones, amplifiers, band-pass filters, audio to digital converters, and processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A complex authentication method, comprising:
   receiving, at an electronic device, a face image;
   extracting one or more feature points from the received face image;
   defining one or more touch points on a display of the electronic device, the one or more touch points corresponding to the one or more feature points;
   receiving one or more touch inputs via the one or more touch points on the display;
   identifying a registered user corresponding to the received face image; and
   in response to identifying the registered user corresponding to the received face image,
   identifying a pattern based on a facial expression change sequence and the one or more touch inputs, the identified pattern being assigned to an operation in an account of the registered user,
   in response to determining the identified pattern is a first pattern assigned to a first operation, performing the first operation by executing a first application, and
   in response to determining the identified pattern is a second pattern assigned a second operation, performing the second operation by executing a second application different than the first application,
   the first and second operations being operations from among a plurality of operations executable by the electronic device in an account of the registered user.

2. The method of claim 1, wherein the identifying of the first pattern comprises:

defining a feature point group including a plurality of feature points based on the one or more feature points extracted from the face image;

detecting a change in a form of the feature point group; and identifying, as the first pattern, a pattern associated with the feature point group based on the detected change in a form.

3. The method of claim 2, wherein the identifying of the first pattern comprises:

identifying, as the first pattern, a pattern associated with the one or more feature points and the received one or more touch inputs based on the detected change in a form.

4. The method of claim 1, wherein the identifying of the first pattern comprises:

receiving an input corresponding to at least a portion of the face image;

detecting a change in a location relationship among a plurality of feature points in the at least a portion of the face image; and identifying the first pattern based on the change in a location relationship.

5. The method of claim 1, wherein the performing of the operation comprises:

executing an application of the electronic device, the application being assigned to the identified first pattern in the account of the registered user.

6. The method of claim 1, wherein the performing of the operation comprises:

authenticating the registered user; and changing a lock state of the electronic device to an unlock state in response to the authenticating indicating a successful authentication.

7. The method of claim 1, wherein the identifying of the registered user comprises:

obtaining a fingerprint image from at least one of the one or more touch inputs; and identifying, as the registered user, a user that corresponds to the fingerprint image.

8. A non-transitory computer readable medium storing computer-executable instructions that, when executed by one or more processors, cause the one or more processors to perform operations including, receiving, at an electronic device, a face image;

extracting one or more feature points from the received face image;

defining one or more touch points on a display of the electronic device, the one or more touch points corresponding to the one or more feature points;

receiving one or more touch inputs via the one or more touch points on the display;

identifying a registered user corresponding to the received face image; and in response to identifying the registered user corresponding to the received face image, identifying a pattern based on a facial expression change sequence and the one or more touch inputs, the identified pattern being assigned to an operation in an account of the registered user, in response to determining the identified pattern is a first pattern assigned to a first operation, performing the first operation by executing a first application, and in response to determining the identified pattern is a second pattern assigned a second operation, performing the second operation by executing a second application different than the first application, the first and second operations being operations from among a plurality of operations executable by the electronic device in an account of the registered user.

9. An electronic device for complex authentication, comprising:

a display configured to receive a first input from a user;

memory storing computer-executable instructions; and one or more processors configured to execute the instructions such that the one or more processors are configured to, receive, at an electronic device, a face image, extract one or more feature points from the received face image, define one or more touch points on a display of the electronic device, the one or more touch points corresponding to the one or more feature points, receive one or more touch inputs via the one or more touch points on the display, identify a registered user corresponding to the received face image, and in response to identifying the registered user corresponding to the received face image, identify a pattern based on a facial expression change sequence and the one or more touch inputs, the identified pattern being assigned to an operation in an account of the registered user, in response to determining the identified pattern is a first pattern assigned to a first operation, perform the first operation by executing a first application, and in response to determining the identified pattern is a second pattern assigned a second operation, perform the second operation by executing a second application different than the first application, the first and second operations being operations from among a plurality of operations executable by the electronic device in an account of the registered user.

10. The electronic device of claim 9, wherein the one or more processors are configured to define a feature point group including a plurality of feature points based on the one or more feature points extracted from the face image, detect a change in a form of the feature point group, and identify, as the first pattern, a pattern associated with the feature point group based on the detected change in a form.

11. The electronic device of claim 10, wherein the one or more processors are configured to identify, as the first pattern, a pattern associated with the one or more feature points and the received one or more touch inputs based on the detected change in a form.

12. The electronic device of claim 9, wherein the one or more processors are configured to receive an input corresponding to at least a portion of the face image, detect a change in a location relationship among a plurality of feature points in the at least a portion of the face image, and identify the first pattern based on the change in a location relationship.

13. The electronic device of claim 9, wherein the one or more processors are configured to execute an application of the electronic device, the application being assigned to the identified first pattern in the account of the registered user.

14. The electronic device of claim 9, wherein the one or more processors are configured to authenticate the registered user, and change a lock state of the electronic device to an unlock state in response to the authenticating indicating a successful authentication.

15. A complex authentication method, comprising:
receiving, at an electronic device, a face image;
tracking, by the electronic device, a movement of at least one feature point extracted from the received face image;
identifying, by the electronic device, an expressional change sequence based on the extracted feature point in response to the movement of the feature point, the expressional change sequence including a plurality of sequential expressional changes;
determining whether the identified expressional change sequence is assigned to an operation of a plurality of operations executable by the electronic device in an account of a registered user;
in response to determining the identified expressional change sequence is a first pattern assigned to a first operation, performing the first operation by executing a first application; and
in response to determining the identified expressional change sequence is a second pattern assigned a second operation, performing the second operation by executing a second application different than the first application,
the first and second operations being operations from among a plurality of operations executable by the electronic device in an account of the registered user.

16. The method of claim 15, further comprising:
assigning a touch point on the face image based on the at least one feature point extracted from the face image; and
identifying an input sequence for the touch point assigned on a display, and
wherein the performing of the operation includes performing the operation based on the identified expressional change sequence and the identified input sequence.

* * * * *